(12) United States Patent
Martens et al.

(10) Patent No.: US 9,371,833 B2
(45) Date of Patent: Jun. 21, 2016

(54) VARIABLE TURBINE/COMPRESSOR GEOMETRY

(71) Applicant: Bosch Mahle Turbo Systems GmbH & Co. KG, Stuttgart (DE)

(72) Inventors: Anatolij Martens, Eislingen (DE); Thomas Streich, Esslingen (DE); Senol Soeguet, Stuttgart (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 653 days.

(21) Appl. No.: 13/768,536

(22) Filed: Feb. 15, 2013

(65) Prior Publication Data

US 2013/0272847 A1    Oct. 17, 2013

(30) Foreign Application Priority Data

Apr. 17, 2012   (DE) .......................... 10 2012 206 302

(51) Int. Cl.
*F01D 17/16* (2006.01)
*F04D 3/00* (2006.01)
*F02B 37/24* (2006.01)

(52) U.S. Cl.
CPC ............... *F04D 3/00* (2013.01); *F01D 17/165* (2013.01); *F02B 37/24* (2013.01); *F05D 2220/40* (2013.01); *F05D 2260/60* (2013.01); *F05D 2260/605* (2013.01); *Y02T 10/144* (2013.01)

(58) Field of Classification Search
None
See application file for complete search history.

(56) References Cited

U.S. PATENT DOCUMENTS

| 4,502,836 A | 3/1985 | Swearingen |
| 2009/0094979 A1 | 4/2009 | Eissler et al. |

FOREIGN PATENT DOCUMENTS

| DE | 19838928 C1 | 4/1999 |
| DE | 102006018055 A1 | 10/2007 |
| DE | 102008034751 A1 | 1/2010 |
| EP | 1256698 A2 | 11/2002 |
| EP | 1925784 A1 | 5/2008 |
| EP | 2243939 A1 | 10/2010 |
| JP | 07150906 A * | 6/1995 |
| JP | 11-350967 A | 12/1999 |
| WO | WO-2006/032827 A1 | 3/2006 |
| WO | WO-2010082119 A2 | 7/2010 |

OTHER PUBLICATIONS

English abstract for DE-102008034751, Jan. 28, 2010.
English abstract for DE-19838928, Apr. 22, 1999.
German Search Report for DE-102011081187.7, Dec. 3, 2012.
German Search Report for DE-102012206301.1, Apr. 18, 2012.
English abstract for JP-11350967, Dec. 21, 1999.

* cited by examiner

*Primary Examiner* — Ninh H Nguyen
*Assistant Examiner* — Justin Seabe
(74) *Attorney, Agent, or Firm* — Fishman Stewart PLLC

(57) ABSTRACT

A variable turbine geometry may have a blade bearing ring and guide blades, each rotatably mounted therein via one of a plurality of respective blade bearing pins. An adjusting ring for adjusting the rotary position of the guide blades may be arranged on a side of the blade bearing ring facing away from the guide blades. The cover disc may define through-openings aligned with the blade bearing pins of the guide blades. The blade bearing ring may define at least one channel configured to create a pressure equalization between the control space and the flow space.

18 Claims, 2 Drawing Sheets

VARIABLE TURBINE/COMPRESSOR GEOMETRY

CROSS-REFERENCE TO RELATED APPLICATIONS

This application claims priority to German Patent Application 10 2010 206 302.1 filed on Apr. 17, 2012, which claims priority to German Patent Application 10 2011 081 187.7 filed on Aug. 19, 2011, both of which are hereby incorporated by reference in their entirety.

TECHNICAL FIELD

The present invention relates to a variable turbine and/or compressor geometry for a charging device, in particular for an exhaust gas turbocharger, according to the preamble of Claim 1. The invention, furthermore, relates to a charging device, in particular an exhaust gas turbocharger having such a variable turbine/compressor geometry.

BACKGROUND

A variable turbine/compressor geometry serves for regulating a performance of a charging device for a combustion engine. A turbine of the charging device in this case is driven by an exhaust gas produced by the combustion engine, transmitting the energy thus gained to a compressor of the charging device. Usually, a variable turbine/compressor geometry serves to regulate the charging device in such a case. The variable turbine/compressor geometry is a facility by means of which a cross section that is available to the exhaust gas driving the turbine can be varied. This is practical in particular in the case of low quantities of the driving exhaust gas since in this case through a reduction of the cross section the performance of the charging device and thus of the combustion engine can be increased. For varying the cross section, the variable turbine/compressor geometry comprises a blade bearing ring in which the guide blades are each rotatably mounted via a blade bearing pin. The blade bearing pin of a guide blade thus penetrates a corresponding opening of the blade bearing ring, wherein the guide blades are usually arranged circularly on the blade bearing ring. Here, the respective guide blades face a cover disc on their outside facing away from the blade bearing ring, which cover disc is located opposite the blade bearing ring. The guide blades are thus arranged between the blade bearing ring and the cover disc. In order to adjust the rotary position of the respective guide blades, an adjusting ring is provided which simultaneously rotates the respective guide blades via the associated blade bearing pins. Here, the adjusting ring is arranged in a control space, which is practically located on the side of the blade bearing ring facing away from the guide blades. Insides of the respective blade bearing pins are thus arranged in the control space.

From WO 2010/082119 A2 a generic variable turbine geometry for a charging device is known, with a blade bearing ring and guide blades rotatably mounted therein via blade bearing pins. Here, on their outside facing away from the associated blade bearing pin, the individual guide blades are facing a cover disc located opposite the blade bearing ring, which in this case is part of a guide blade cage, wherein in the cover disc recesses for weight reduction are arranged.

Problematic with known variable turbine/compressor geometries is a pressure differential between the control space and the flow space, in which the guide blade vanes are arranged. The exhaust gas that is present in the control space, which is present with a positive pressure, results in particular in that the blade bearing pins are axially loaded with pressure along the guide blade and because of this the respective guide blades are also pushed axially away from the blade bearing ring. This results, in particular, in that the outsides of the respective guide blade are pushed against the cover disc. Thus, when changing the rotary position of the respective guide blade, a reaction characteristic or a hysteresis behaviour of the guide blades is negatively affected in addition to an accelerated wear.

SUMMARY

The present invention deals with the problem of stating an improved or at least alternative embodiment for a variable turbine/compressor geometry of a charging device, in particular of an exhaust gas turbocharger, which is characterized in particular by an improved reaction behaviour and a reduced wear.

According to the invention, this problem is solved through the subjects of the independent claims. Advantageous embodiments are subject of the dependent claims.

The present invention is based on the general idea of establishing a pressure equalization between a control space and a flow space, in which guide blade vanes of guide blades are located, and/or loading the individual guide blades with a pressure that is opposite to the positive pressure present in the control space, so that the guide blades with their guide blade vanes no longer rub against the cover disc or a guide blade cage and because of this both the response behaviour can be improved as well as the wear reduced. The variable turbine and/or compressor geometry for a charging device according to the invention, in particular for an exhaust gas turbocharger, to this end comprises a blade bearing ring and guide blades rotatably mounted therein via blade bearing pins. Likewise provided is a control space for an adjusting ring for adjusting the rotary position of the guide blades, which is arranged on the side of the blade bearing ring facing away from the guide blades. On their outside facing away from the associated blade bearing pins the respective guide blades are facing the cover disc located opposite the blade bearing ring or the guide cage arranged there. According to the invention, through-openings are now provided in the cover disc, in each case aligned with the blade bearing pins of the guide blades, via which an opposing force that is present to the positive pressure of the control space can be exerted on the guide blades, which at least reduce, preferentially entirely eliminate a friction between the guide blades, more specifically between the outsides of the guide blade vanes and the cover disc, as a result of which the wear in this region can be significantly reduced and at the same time a hysteresis behaviour of the variable turbine and/or compressor geometry is positively influenced. Additionally or alternatively, at least one channel can be provided in the blade bearing ring, which makes possible a pressure equalization between the control space and the flow space, in which the guide blade vanes of the guide blades are arranged, so that in this case no force pushing the guide blade vanes against the cover disc on the guide blades is generated, as a result of which in turn a reduced wear and an improved response behaviour can be achieved. Here it is clear to say that the two mentioned embodiments can be employed alternatively or cumulatively. With the variable turbine and/or compressor geometry according to the invention, the longevity and the wear-resistance of a charging device equipped with such, for example an exhaust gas turbocharger, can be advantageously influenced.

In an advantageous further development of the solution according to the invention, the through-openings in the cover disc have a smaller diameter than the blade bearing pins and are directly directed at a face end of an associated guide blade vane. Because of this it can be achieved that the force counteracting the positive pressure in the control space is directly exerted on the guide blade and the latter, because of this, can be induced to lift the guide blade vane off the cover disc. When the force acting on the guide blade because of the positive pressure that is present in the control space than the opposing force, the latter contributes at least to reducing the friction between guide blade vane and cover disc, as a result of which likewise in turn the wear, compared to the embodiments previously known from the prior art, can be reduced.

In a further advantageous embodiment of the solution according to the invention, the at least one channel between the control space and the flow space is arranged adjacent to a blade bearing pin. Providing a plurality of such channels, which in circumferential direction are arranged for example evenly distributed and in particular between the blade bearing pins is obviously likewise conceivable. A plurality of such channels prevents in particular an unfavourable flow influencing as this can be the case for example with merely a single channel under certain conditions.

Practically, the channel runs parallel, in particular coaxially to the blade bearing pin, so that in this case a bore accommodating the blade bearing pin in the blade bearing ring is designed with clearance to the blade bearing pin and because of this surrounds the blade bearing pin for example in the shape of a ring. Obviously, the channel can also be formed in an axial recess on the blade bearing pin, wherein on the side of the blade bearing pin located opposite the control space, said blade bearing ring can have a recess under an associated guide blade root. Such a recess or milled portion can obviously be present also in the guide blade root itself, so that in this case the entire channel preferably runs in the guide blade.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar of functionally same components.

BRIEF DESCRIPTION OF THE DRAWINGS

It shows, in each case schematically.

DETAILED DESCRIPTION

Figure 1:
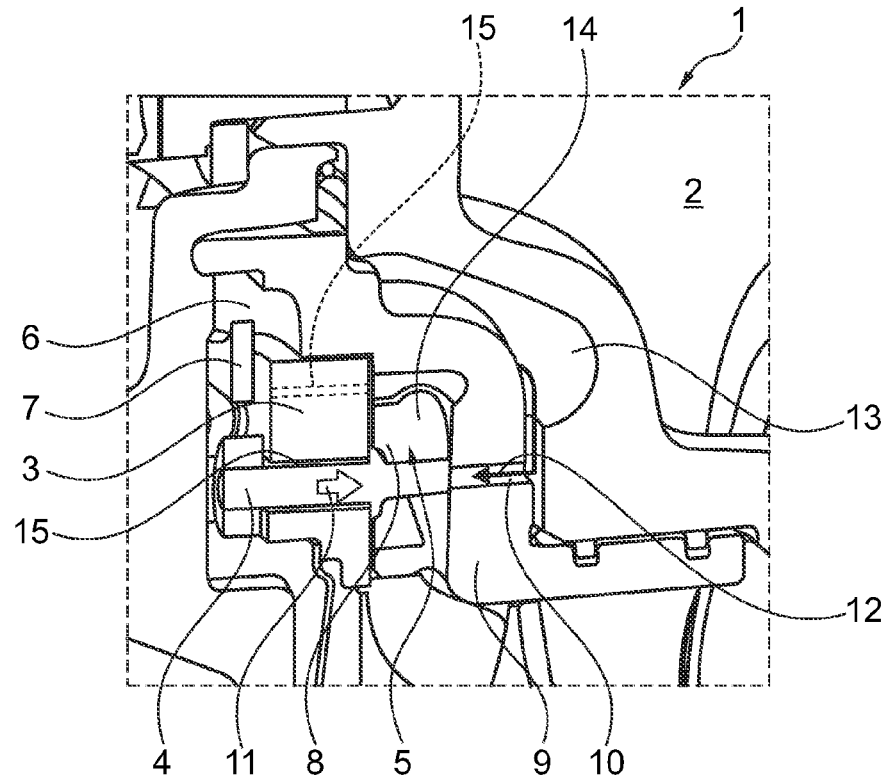
FIG. 1 a sectional representation through a variable turbine and/or compressor geometry according to the invention according to a first embodiment, FIG. 2 different views of the variable turbine and/or compressor geometry in a further embodiment, FIG. 3 a guide blade designed according to the invention for realizing the invention and a sectional representation through the variable turbine/compressor geometry.
Figure 2:
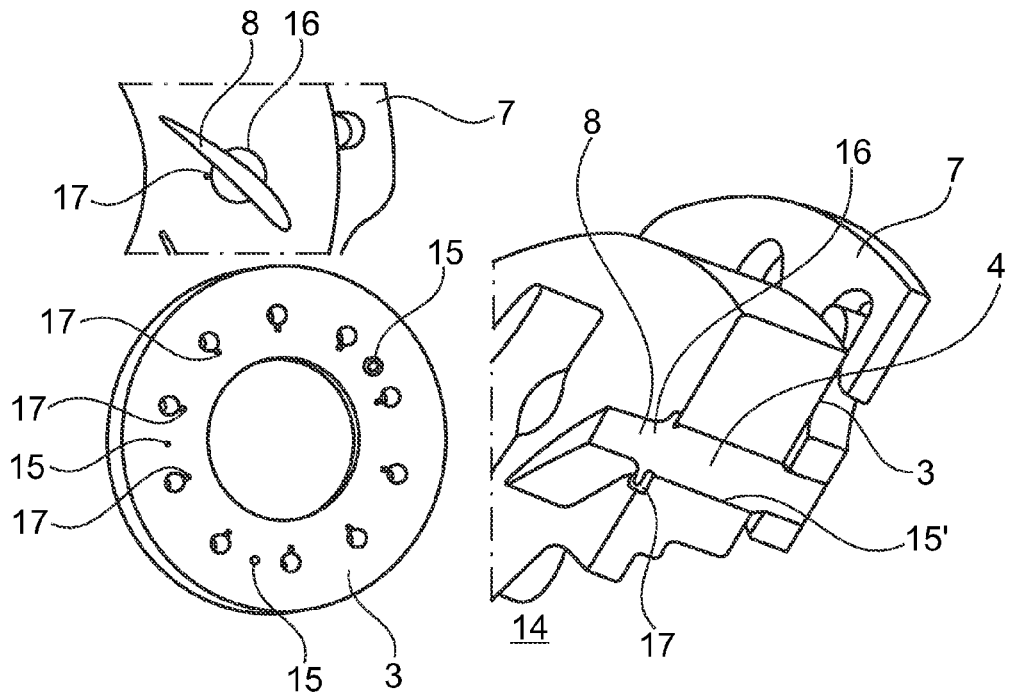
Figure 3:
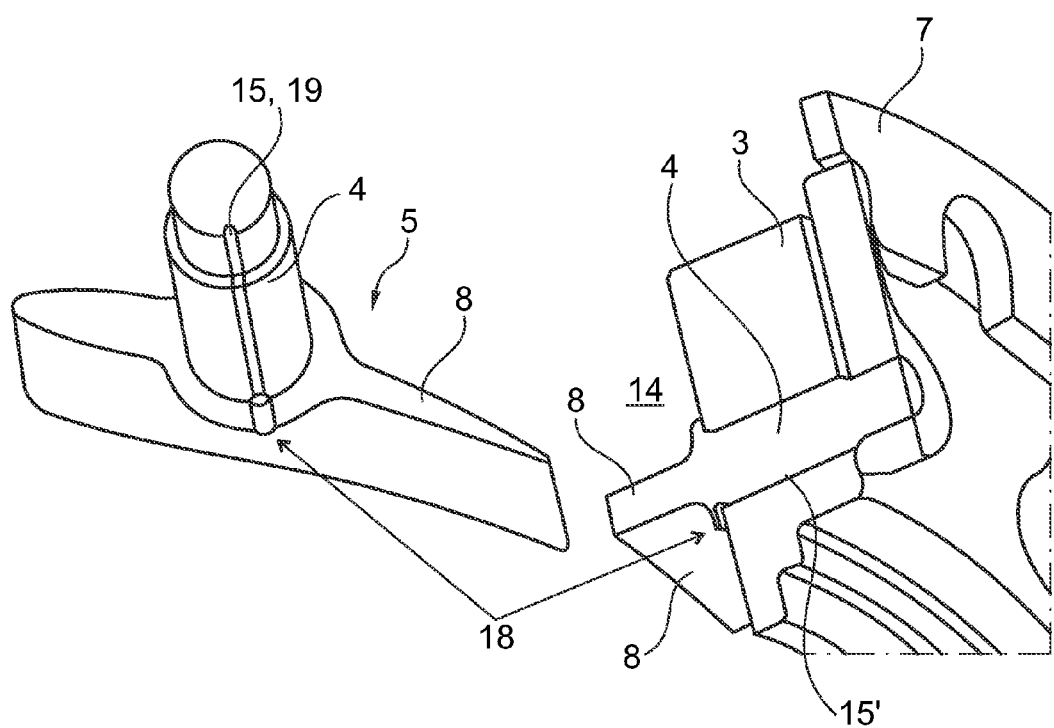

According to FIG. 1 to 3, a variable turbine and/or compressor geometry 1 for a charging device 2, in particular for an exhaust gas turbocharger in a motor vehicle, comprises a blade bearing ring 3, in which guide blades 5 are rotatably mounted via blade bearing pins 4. Likewise provided is a control space 6 for an adjusting ring 7 for adjusting a rotary position of the guide blades 5, which is arranged on the side of the blade bearing ring 3 facing away from the guide blades 5. In addition, the guide blades 5 have guide blade vanes 8, which on their outsides facing away from the associated blade bearing pin 4 are facing a cover disc 9 located opposite the blade bearing ring 3, which for example can also be designed as guide blade cage. The guide blade vanes 8 in this case are arranged in a flow space 14.

During the operation of the variable turbine and/or compressor geometry 1, exhaust gas for example with high pressure flows towards the guide blade vanes 8, wherein the high pressure is at least partially also present in the control space 6 at the same time. If the pressure in the control space 6 is higher than in the flow space 14, it causes an axial force 11 onto the blade bearing pin 4 in the direction of the cover disc 9, which in the most unfavourable case leads to the rubbing of the guide blade vanes 8 against the cover disc 9 and thus to an increased wear or to a significantly worsened hysteresis behaviour. For this reason, the invention proposes providing through-openings 10 in the cover disc 9 in each case aligned with the blade bearing pins 4 of the guide blades 5, as a result of which an opposite force 12 is exerted on the guide blade pin 4 via the guide blade vanes 8 and because of this the friction of the guide blade vanes 8 on the cover disc 9 can be at least reduced, preferentially eliminated. With the openings 10 in the cover disc 9 provided according to the invention, a pressure equalization is thus possible between a flow space 13 outside the cover disc 9 and the flow space 14, in which the guide blade vanes 8 are rotating.

The through-openings 10 in the cover disc 9 in this case usually have a smaller diameter than the guide blade pins 4 and/or are directly directed at a face end, i.e. an outside of the associated guide blade vane 8, as a result of which the opposing forces 11 and 12 can be particularly favourable eliminated or at least reduced.

Additionally or alternatively to this, at least one channel 15 can be provided in the blade bearing ring 3 and/or in guide blade 5, in particular in its blade bearing pin 4, which makes possible a pressure equalization between the control space 6 and the flow space 14. The channel 15 can for example be arranged adjacent to a blade bearing pin 4, as this is shown for example with interrupted drawn line in FIG. 1, wherein it is obviously also conceivable that, distributed over the circumference, a plurality of channels 15 are provided between the individual through-openings for the blade bearing pins 4.

In a special embodiment, the channel 15 can be designed as ring-shaped channel 15' and in this form, annularly surrounds the blade bearing pin 4, wherein a recess 17 can then be provided in the blade bearing ring 3 under an associated guide blade root 16, which makes possible connecting the annular channel 15' with the flow space 14. It is also conceivable, in general, that in the region of the guide blade root 16 a milled portion 18 (see FIG. 3) is provided, which in particular runs orthogonally to the blade bearing pin 4 and the associated guide blade 5 and which connects the annular channel 15' with the flow space 14. Purely theoretically, an at least partial course of the channel 15 within the guide blade 5 and in particular within the blade bearing pin 4 is also conceivable, as this is hinted for example according to FIG. 3. In this case, the channel 15 can for example be formed as axial groove 19 or run entirely within the blade bearing pin 4, wherein obviously a connection with the flow space 14 has to be provided, which is accomplished according to FIG. 2 via the recess 17 and according to FIG. 3 via the milled portion 18.

With the variable turbine and/or compressor geometry 1 according to the invention, and in particular the through-openings 10 in the cover disc 9 for the (equalization) channels 15, 15' provided here, a frictional force between the guide blade vanes 8 and the cover disc 9 can be reduced or entirely eliminated at best, as a result of which not only the wear can be reduced, but also an improved response behaviour can be achieved.

The invention claimed is:

1. A variable turbine geometry, comprising:
   a blade bearing ring and a plurality of guide blades each rotatably mounted on the blade bearing ring via an associated blade bearing pin of a plurality of blade bearing pins, the plurality of guide blades each including at least a guide blade vane and a guide blade root;
   an adjusting ring surrounded by a control space for adjusting the rotary position of the plurality of guide blades arranged on a side of the blade bearing ring facing away from the guide blade vane of the plurality of guide blades;
   wherein the guide blade vane of the respective guide blades is arranged in a flow space between the blade bearing ring and a cover disc;
   wherein the cover disc defines a plurality of through-openings aligned with the plurality of blade bearing pins;
   wherein the blade bearing ring defines at least one channel configured to create a pressure equalization between the control space and the flow space, wherein the at least one channel extends annularly and surrounds the associated blade bearing pin of at least one guide blade of the plurality of guide blades; and
   wherein the blade bearing ring further defines a recess disposed under the guide blade root of the at least one guide blade.

2. The variable turbine geometry according to claim 1, wherein the cover disc is part of a guide blade cage.

3. The variable turbine geometry according to claim 1, wherein the plurality of through-openings have a smaller diameter than the plurality of blade bearing pins and are directly directed at a face end of the associated guide blade vane.

4. The variable turbine geometry according to claim 1, wherein the at least one channel is arranged adjacently to the blade bearing pin.

5. The variable turbine geometry according to claim 1, wherein the at least one channel runs parallel to the blade bearing pin.

6. The variable turbine geometry according to claim 1, wherein the at least one guide blade includes a groove defined by a milled portion arranged in a region of the guide blade root and configured to extend orthogonally to the associated blade bearing pin.

7. The variable turbine geometry according to claim 1, wherein at least one other guide blade includes another channel disposed in the associated blade bearing pin and extending at least partially along the blade bearing pin.

8. A charging device, comprising:
   a variable turbine geometry including a blade bearing ring and a plurality of guide blades each rotatably mounted on the blade bearing ring via an associated blade bearing pin of a plurality of blade bearing pins, the plurality of guide blades each including at least a guide blade vane and a guide blade root, and wherein the guide blade vane of the plurality of guide blades is arranged in a flow space between the blade bearing ring and a cover disc;
   the geometry further including a control space for an adjusting ring for adjusting the rotary position of the plurality of guide blades arranged on a side of the blade bearing ring facing away from the guide blade vane of the plurality of guide blades;
   wherein the cover disc defines a plurality of through-openings aligned with the plurality of blade bearing pins;
   wherein the blade bearing ring defines at least one channel configured to create a pressure equalization between the control space and the flow space, the at least one channel extending annularly and surrounding the associated blade bearing pin of at least one guide blade of the plurality of guide blades; and
   wherein the guide blade root of the at least one guide blade defines a groove extending transversely to the associated blade bearing pin and connecting the at least one channel with the flow space.

9. The charging device according to claim 8, wherein the cover disc is part of a guide blade cage.

10. The charging device according to claim 8, wherein the plurality of through-openings have a smaller diameter than the plurality of blade bearing pins and are directly directed at a face end of the associated guide blade vane.

11. The charging device according to claim 8, wherein the at least one channel is arranged adjacently to the blade bearing pin.

12. The charging device according to claim 8, wherein the at least one channel runs parallel to the blade bearing pin.

13. The charging device according to claim 8, wherein the groove includes a milled portion of the guide blade root and extends orthogonally to the associated blade bearing pin.

14. The charging device according to claim 8, wherein the blade bearing ring further includes another channel extending annularly and surrounding the the associated blade bearing pin of at least one other guide blade, wherein the blade bearing ring defines a recess under the guide blade root of the at least one other guide blade.

15. The charging device according to claim 8, wherein at least one other guide blade includes another channel disposed in the associated blade bearing pin and extending at least partially along the blade bearing pin.

16. The variable turbine geometry according to claim 2, wherein the plurality of through-openings have a smaller diameter than at least one of the blade bearing pins and are directly directed at a face end of the associated guide blade vane.

17. The variable turbine geometry according to claim 16, wherein the at least one channel is arranged adjacently to the associated blade bearing pin of the at least one guide blade.

18. The variable turbine geometry according to claim 17, wherein the at least one channel extends coaxially to the associated blade bearing pin of the at least one guide blade.

* * * * *